(12) United States Patent
Clegg et al.

(10) Patent No.: US 12,554,281 B2
(45) Date of Patent: Feb. 17, 2026

(54) PROJECTION OPTICS FOR OPTICAL COMPUTING

(71) Applicant: Microsoft Technology Licensing, LLC, Redmond, WA (US)

(72) Inventors: James Hilton Clegg, Cambridge (GB); Douglas James Kelly, Cambridge (GB); Francesca Parmigiani, Cambridge (GB); Grace Brennan, Cambridge (GB); Jiaqi Chu, Cambridge (GB); Lucinda Michelle Pickup, Cambridge (GB); Hitesh Ballani, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 18/204,263

(22) Filed: May 31, 2023

(65) Prior Publication Data
US 2024/0402750 A1    Dec. 5, 2024

(51) Int. Cl.
| G06E 1/00 | (2006.01) |
| G02B 3/08 | (2006.01) |
| G02B 27/09 | (2006.01) |

(52) U.S. Cl.
CPC .............. *G06E 1/00* (2013.01); *G02B 3/08* (2013.01); *G02B 27/0922* (2013.01)

(58) Field of Classification Search
CPC .......... G06E 1/00; G06E 3/005; G06E 3/008; G02B 3/08; G02B 27/0922; G02B 3/00; G02B 19/0014; G02B 27/0961
(Continued)

(56) References Cited

U.S. PATENT DOCUMENTS

| 5,534,704 A * | 7/1996 | Robinson ................ G06E 3/005 |
| | | 250/550 |
| 6,339,503 B1 * | 1/2002 | Derstine .............. G02B 3/0062 |
| | | 359/663 |

(Continued)

FOREIGN PATENT DOCUMENTS

| CN | 101154054 A * | 4/2008 | ......... G03F 7/70291 |
| CN | 118818733 A * | 10/2024 | ............. H04N 23/57 |

(Continued)

OTHER PUBLICATIONS

Spall, et al., "Fully Reconfigurable Coherent Optical Vector-Matrix Multiplication", In Repository of arXiv:2009.12095v1, Sep. 25, 2020, 5 Pages.

(Continued)

*Primary Examiner* — Tarifur R Chowdhury

(74) *Attorney, Agent, or Firm* — Schwegman Lundberg & Woessner, P.A.

(57) ABSTRACT

An optical projection system is described that may be used in an optical computing element. The optical projection system has an optical axis and comprises first, second and third lens arrangements. The first and third lens arrangements are rotationally symmetric about the optical axis and are positioned to capture light from an array of sources on a source plane and image the sources onto an output plane. The second lens arrangement is positioned between the first and third lens arrangements. The second lens arrangement has optical power of a first magnitude in a first orientation and optical power of a second magnitude in a second orientation, wherein the first magnitude is larger than the (Continued)

second magnitude and wherein the first orientation is orthogonal to the second orientation and both the first and second orientations are orthogonal to the optical axis.

19 Claims, 9 Drawing Sheets

(58) Field of Classification Search
USPC .......................................................... 359/107
See application file for complete search history.

(56) References Cited

U.S. PATENT DOCUMENTS

| | | | | |
|---|---|---|---|---|
| 6,842,290 | B2* | 1/2005 | Liang | G02B 21/241 359/619 |
| 2003/0021037 | A1* | 1/2003 | Nemes | G02B 27/0966 359/710 |
| 2006/0176579 | A1* | 8/2006 | Kuwa | G02B 17/0832 359/727 |
| 2008/0079921 | A1* | 4/2008 | Oshida | G03F 7/70075 355/55 |
| 2014/0268305 | A1* | 9/2014 | Tazawa | G02B 6/29311 359/320 |
| 2022/0416908 | A1* | 12/2022 | Bunandar | G06N 3/0675 |
| 2023/0281497 | A1* | 9/2023 | Gidney | G06F 7/72 359/107 |
| 2024/0402750 | A1* | 12/2024 | Clegg | G02B 13/08 |
| 2024/0428023 | A1* | 12/2024 | Gladrow | G06N 3/0499 |

FOREIGN PATENT DOCUMENTS

| | | | | |
|---|---|---|---|---|
| CN | 120539921 | A * | 8/2025 | |
| EP | 3100094 | B1 * | 11/2021 | ............. G02B 13/22 |
| WO | WO-2023034029 | A1 * | 3/2023 | ............. G02B 27/18 |

OTHER PUBLICATIONS

Wang, et al., "An Optical Neural Network using Less than 1 Photon per Multiplication", In Journal of Nature Communications, vol. 13, Issue 1, Jan. 10, 2022, pp. 1-8.
Yang, et al., "On-chip CMOS-compatible Optical Signal Processor", In Journal of Optics Express, vol. 20, Issue 12, Jun. 1, 2012, pp. 13560-13565.
Yang, et al., "On-chip Optical Matrix-vector Multiplier for Parallel Computation", In Proceedings of International Society for Optics and Photonics, Jun. 21, 2013, 3 Pages.
Zhou, et al., "Photonic Matrix Multiplication Lights up Photonic Accelerator and Beyond", In Journal of Light: Science & Applications, vol. 11, Issue 1, Feb. 3, 2022, pp. 1-21.
D. Psaltis, "Two-dimensional optical processing using one-dimensional input devices", Proceedings of the IEEE, vol. 72, Issue 7, Jul. 1984, pp. 962-974.
International Search Report and Written Opinion received for PCT Application No. PCT/US2024/030140, Sep. 6, 2024, 20 pages.
S. Jutamulia, et al., "Overview of hybrid optical neural networks", Optics & Laser Technology, vol. 28, Issue 2, Mar. 1996, pp. 59-72.
Yuan, et al., "Fabrication of Microlens Array and Its Application: A Review", Chinese Journal of Mechanical Engineering, vol. 31, Feb. 27, 2018, pp. 1-9.
Zhang, et al., "Design of a Singlet Lens and the Corresponding Aberration Correction Approaches for Cell Phone Camera", IEEJ transactions on electrical and electronic engineering, vol. 5, Issue 4, Jun. 18, 2010, pp. 474-485.
International Preliminary Report on Patentability (Chapter I) received for PCT Application No. PCT/US2024/030140, mailed on Dec. 11, 2025, 15 pages.

* cited by examiner

PROJECTION OPTICS FOR OPTICAL COMPUTING

BACKGROUND

Many computational problems, including gradient-descent, involve vector-matrix multiplication. This has typically been performed using digital hardware but as the vector and matrix sizes increase, this is becoming a computational bottleneck. Consequently, hardware is being developed to perform these multiplications in the optical domain. Some implementations of vector-matrix multiplication use optical waveguides and others use free-space optics.

The embodiments described below are not limited to implementations which solve any or all of the disadvantages of known optical arrangements for performing vector-matrix multiplication.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An optical projection system is described that may be used in an optical computing element. The optical projection system has an optical axis and comprises first, second and third lens arrangements (which may be aligned on or close to the optical axis). The first and third lens arrangements are rotationally symmetric about the optical axis and are positioned to capture light from an array of sources on a source plane and image the sources onto an output plane. The second lens arrangement is positioned between the first and third lens arrangements. The second lens arrangement has optical power of a first magnitude (either positive or negative) in a first orientation and optical power of a second magnitude in a second orientation, wherein the first magnitude is larger than the second magnitude and wherein the first orientation is orthogonal to the second orientation and both the first and second orientations are orthogonal to the optical axis. The second magnitude may be zero.

By minimising the number of non-rotationally symmetric lens arrangements in the optical projection system, the overall quality of the lenses in the system is increased and this improves the optical performance (e.g. reduced losses and/or aberrations). Furthermore, the configuration of lenses enables additional light to be captured from the array of sources compared to known systems that use interleaved 4F/2F optical systems and this improves the optical efficiency and increases the signal to noise ratio.

An optical collection system is also described that may be used for an optical computing element. The optical collection system may be used in combination with the optical projection system described herein or may be used independently. The optical collection system has an optical axis and comprises fourth, fifth and sixth lens arrangements (which may be aligned on or close to the optical axis). The fourth and fifth lens arrangements are rotationally symmetric about the optical axis and are positioned to capture light from an input plane and image it onto an output plane. The sixth lens arrangement is positioned between the fifth lens arrangement and the output plane. The sixth lens arrangement has optical power of a third magnitude in a first orientation and has optical power of a fourth magnitude in a second orientation, wherein the fourth magnitude is larger than the third magnitude and wherein the first orientation is orthogonal to the second orientation and both the first and second orientations are orthogonal to the optical axis. The third magnitude may be zero.

As with the optical projection system, by minimising the number of non-rotationally symmetric lens arrangements in the optical collection system, the overall quality of the lenses in the system is increased and this improves the optical performance (e.g. reduced losses and/or aberrations). Furthermore, the configuration of lenses enables a reduction in the size and aspect ratio of each detector in an array of detectors position on the output plane, thereby reducing the resistance of each detector and increasing its speed.

Many of the attendant features will be more readily appreciated as the disclosed subject matter becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Vector-matrix multiplication (which may also be referred to as vector-by-matrix multiplication) involves calculating y=Ax, where x is a vector of length N, A is a matrix of size M×N and y is a vector of length M. Where this is performed in optics, this calculation maps to optical hardware as follows:

- An array of independent optical sources driven in N distinct groups, such that the signal level of each group encodes x,
- A M×N modulator device (i.e. a two-dimensional array of modulator elements),
- An array of optical detectors in M independent groups, so that the M groups encode y,
- Source to modulator mapping optics between the sources and the modulator device, and
- Modulator to detector mapping optics between the modulator device and the detectors.

The sources are driven, e.g., by suitable electronic driver circuitry that operates on electronic input signals representing the vector x, to optically encode x in the N signal levels (e.g., amplitudes or intensity) of the light output by the N sources or groups of sources. The source to modulator mapping optics collects light from the sources in such a way that each group (of the N distinct groups) illuminates a different region (e.g. a different row) on the M×N modulator device. Depending upon whether the system operates in transmission or reflection, the modulator to detector mapping optics collects light transmitted through or reflected by the modulator elements in such a way that light from different regions (e.g. different columns) of the modulator device is incident upon different ones of the M groups of detectors. The detectors may convert the M received optical output signals, which collectively encode the result y of the vector-by-matrix multiplication, into respective electronic output signals (e.g., a photocurrent or voltage), and may be read out by suitable electronic circuitry.

Figure 1:
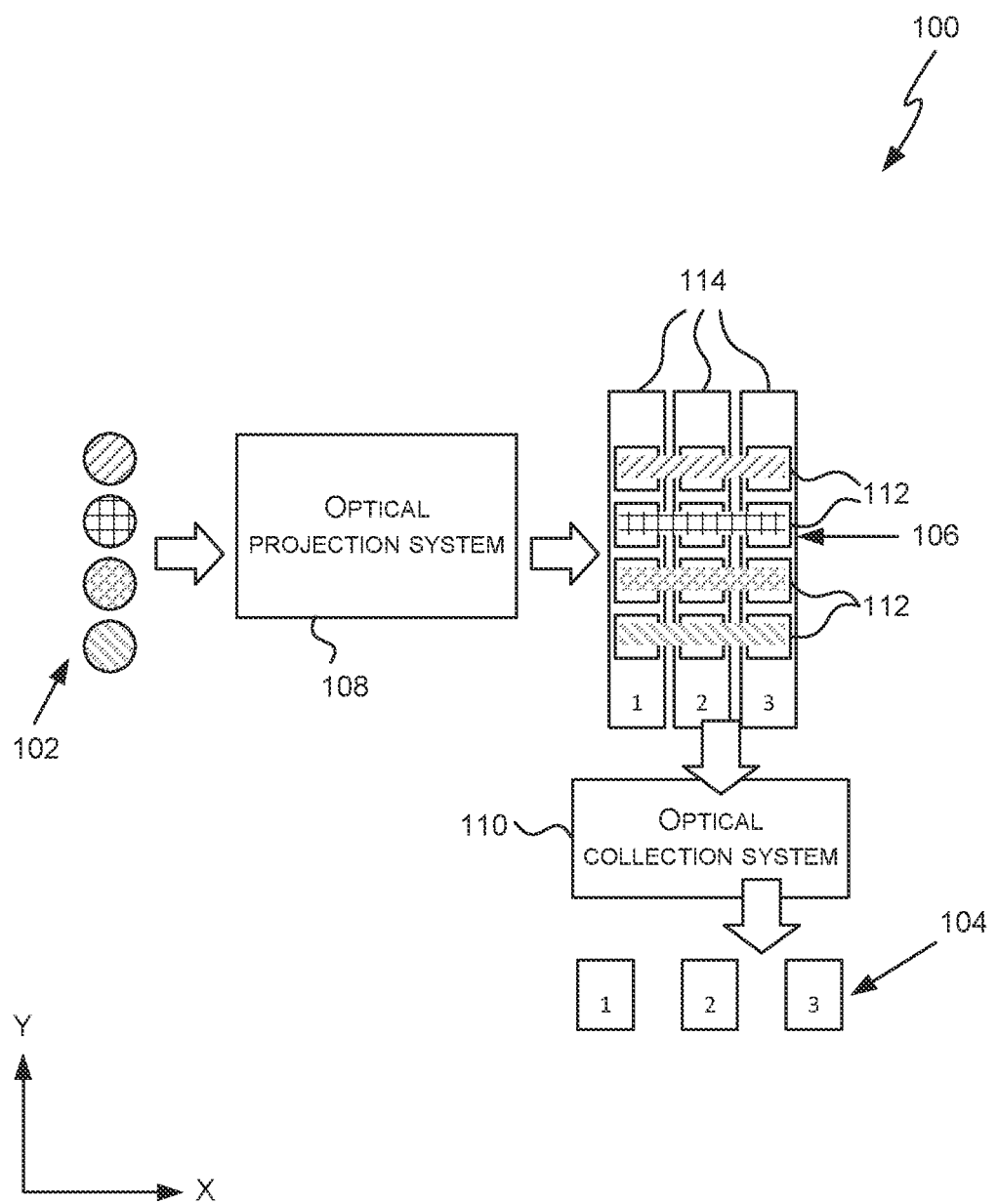
FIG. 1 is a schematic diagram of a first example optical computing element that uses free-space optics.

FIG. 1 is a schematic diagram of a first example arrangement 100 using free-space optics. Where free-space optics are used, the source to modulator mapping optics may be referred to as an optical projection system and the modulator to detector mapping optics may be referred to as an optical collection system. The arrangement 100 comprises 4 sources (or groups of sources) shown by circles 102, 3 distinct optical detectors shown by trapezia 104 and a modulator 106. The modulator 106 has 3×4 elements shown by the squares in FIG. 1. The arrangement 100 further comprises an optical projection system 108 and an optical collection system 110. The optical projection system 108 spreads light from each source group over multiple modulator elements, as indicated by the horizontal bands 112 in FIG. 1. The optical collection system 110 maps each of M regions 114 of the modulator 106 onto a different optical detector. This example is for N=4 and M=3, but it will be appreciated that in practice, the values of N and M may be much larger (e.g. M=N=2000).

As shown in FIG. 1, both the optical projection system 108 and optical collection system 110 operate asymmetrically. The optical projection system 108 spreads light over multiple modulator elements in a first direction (e.g. the horizontal direction in FIG. 1) while keeping the signals distinct in a second direction that is perpendicular to the first direction (e.g. the vertical direction in FIG. 1). In contrast, the optical collection system 110 collects light from multiple modulator elements in the second (e.g. vertical) direction while keeping the signals distinct in the first (e.g. horizontal) direction. Both the first and second directions, which are orthogonal to each other, are orthogonal to the optical axis, as is more clearly shown in FIGS. 2 and 3.

Figure 2:
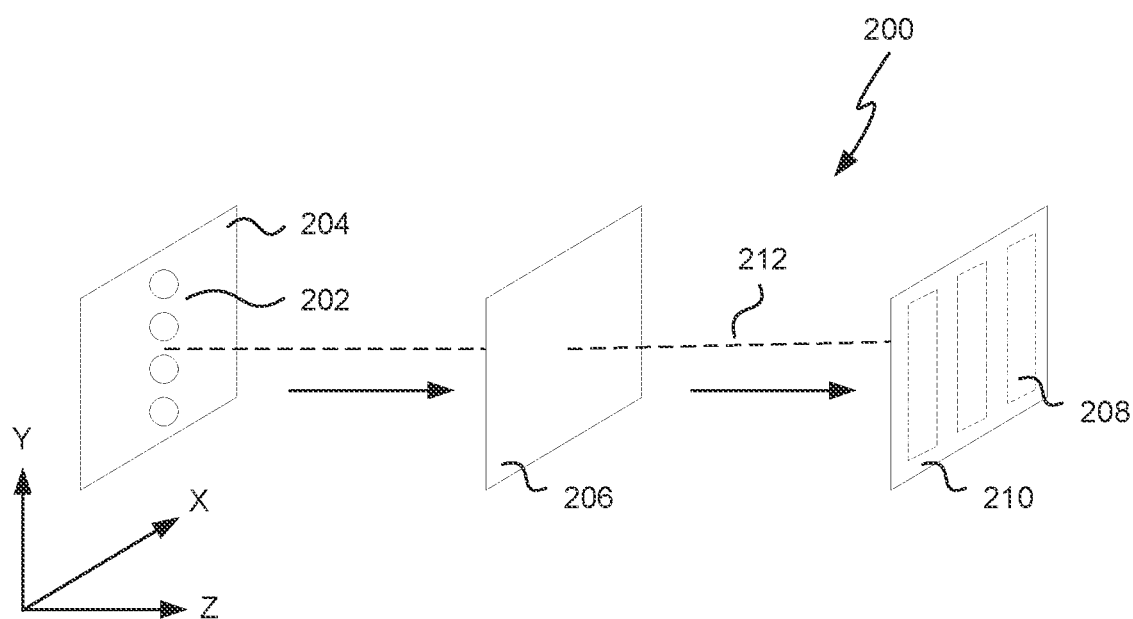
FIG. 2 is a schematic diagram of a second example optical computing element that uses free-space optics.

FIG. 2 shows a second example arrangement 200 using free-space optics. It shows four sources 202 in a source (or input) plane 204, a plane 206 where the modulator is positioned and three detectors 208 in a detector (or output) plane 210. The optical axis is marked by a dotted line 212 and it can be seen that the three planes 204, 206 and 210 are all orthogonal to the optical axis, which is parallel to the z-axis in the orientation shown, with the sources arranged in a line parallel to the y-axis and the detectors arranged in a line parallel to the x-axis.

Figure 3:
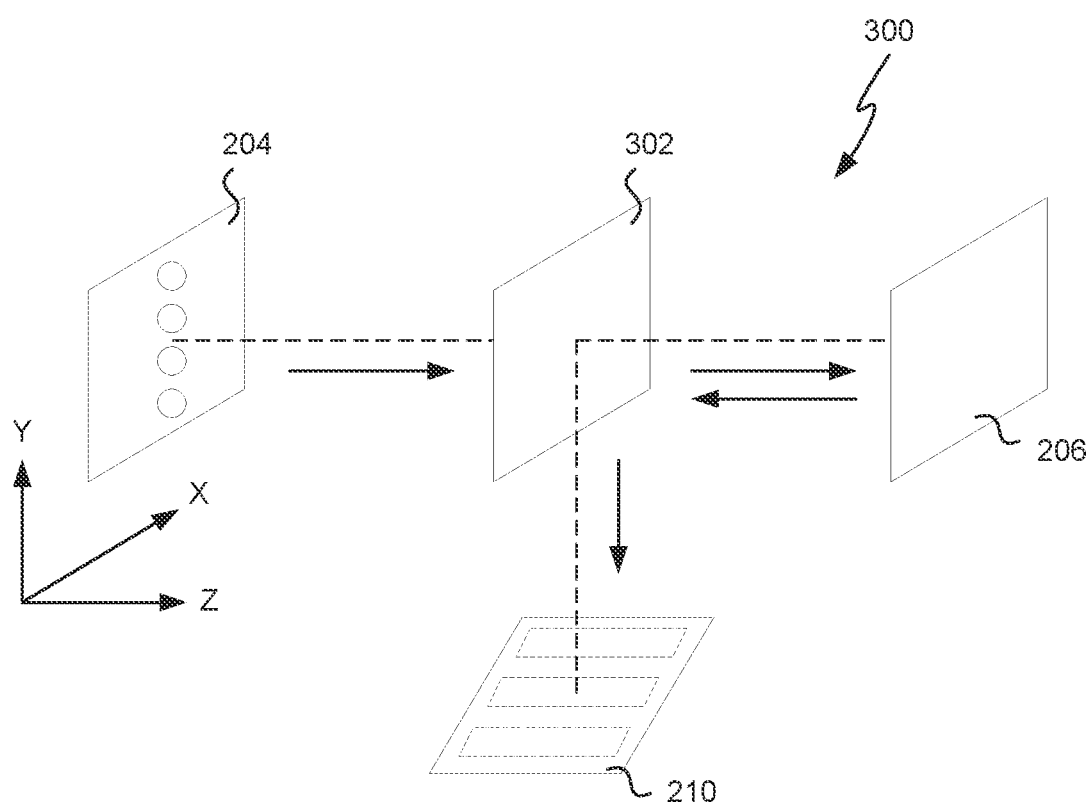
FIG. 3 is a schematic diagram of a third example optical computing element that uses free-space optics.

In the arrangement shown in FIG. 2, the modulator works in transmission. FIG. 3 shows a similar arrangement 300 that instead works in reflection. The arrangement includes a plane 302 where a beam-splitter is positioned (e.g. in the form of a half silvered mirror). As a result, the detectors are still arranged in a line parallel to the x-axis, but the detector (or output) plane is now orthogonal to the y-axis, since the optical axis is changed from parallel to the z-axis to parallel to the y-axis by the beam-splitter. As shown in FIG. 3, where the modulator operates in reflection, rather than transmission, the resulting arrangement is larger because of the presence of the beam-splitter.

FIGS. 2 and 3 do not show the optical projection and collection systems. The optical projection system is positioned between the source and modulator planes 204, 206 and the optical collection system is positioned between the modulator and detector planes 206, 210.

Figure 4A:
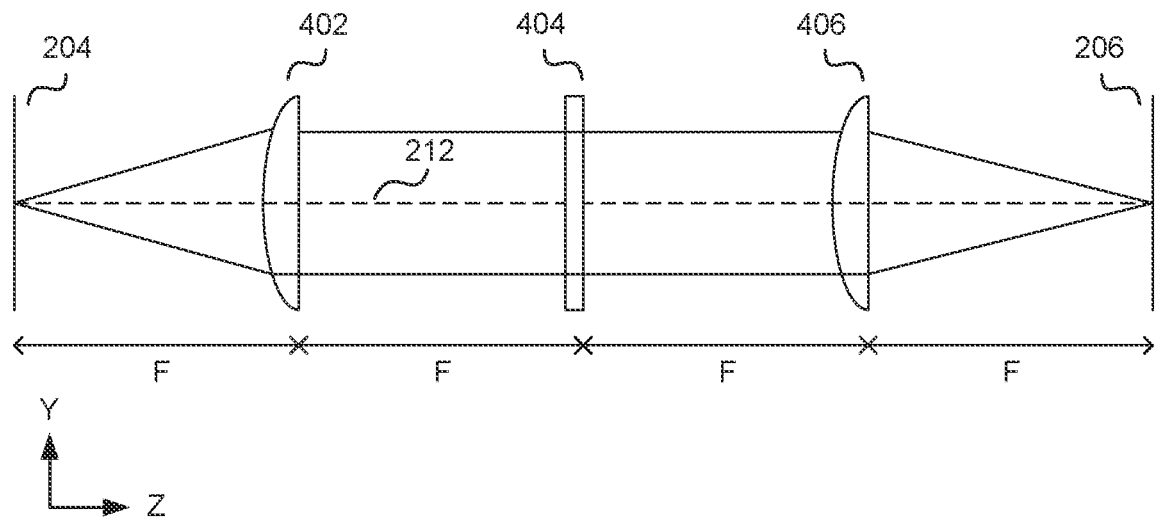
FIGS. 4A and 4B are schematic diagrams of an optical projection system comprising cylindrical lenses.
Figure 4B:
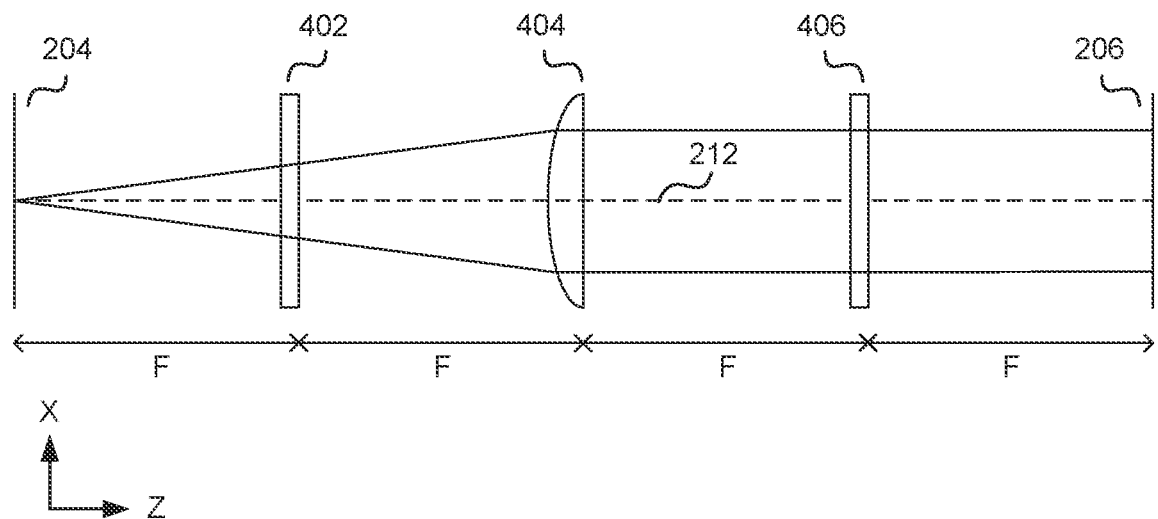

As described above, both the optical projection system and optical collection system operate asymmetrically. A typical design for the optical projection system is to have a cylindrical optical 4F system operating in the y direction interleaved with a cylindrical optical 2F system operating in the x direction, as shown in FIGS. 4A and 4B. FIG. 4A shows a side view and FIG. 4B shows a top view and the x, y, z-axes are shown in the same orientation as they are in FIGS. 2 and 3. The system shown in FIGS. 4A and 4B comprises three cylindrical lenses 402, 404, 406. As a consequence of the lack of rotational symmetry of the cylindrical lenses, in the y direction (as shown in the side view in FIG. 4A), the system is a 4F system with the first and third lenses 402, 406 having optical power, and in the x direction (as shown in the top view in FIG. 4B), the system is a 2F system with only the second lens 404 having optical power. This means that in the y direction, the sources (on source plane 204) are focused onto the modulator (on modulator plane 206), whereas in the x direction, the light emitted from the sources (on source plane 204) is spread laterally onto the modulator (on modulator plane 206). This results in each source (or group of sources) illuminating a different row of modulator elements (e.g. as shown in FIG. 1).

There are a number of drawbacks of the design shown in FIGS. 4A and 4B. Firstly, all of the lenses in the system are cylindrical. Cylindrical lenses are harder to make than spherical lenses and so the range of available high-quality cylindrical lenses is smaller than for spherical lenses (and they are more expensive). Secondly, for a high performance system as much light as possible needs to be captured from the sources and projected onto the modulator, otherwise this impacts losses and signal to noise ratio. This means that the first lens in the system needs to be placed close to the source plane and this is particularly important where the sources are not highly directional (i.e. the sources have a divergent output), e.g. where microLEDs are used. As the system shown in FIGS. 4A and 4B comprises two interleaved arrangements, this means that both the first lens in the 4F system (lens 402) and the first lens in the 2F system (lens 404) needs to be positioned close to the source plane 204 and this is not possible. Even if the first lens in the 4F system (lens 402) is placed close to the source plane 204, there will still be a significant distance between the first lens in the 2F system (lens 404) and the source plane 204 because of the presence of the first lens in the 4F system (lens 402).

Described herein are improved optical projection systems which may be used in an optical computing element to perform vector-matrix multiplication. These improved optical projection systems may, for example, be used in the systems 100, 200, 300 shown in FIGS. 1-3. These systems use a combination of lenses which are rotationally symmetric about the optical axis (e.g. spherical lenses or rotationally symmetric aspherical lenses) and lenses which are not rotationally symmetric about the optical axis (e.g. cylindrical lenses). As these systems are a single optical arrangement and do not comprise two, interleaved but essentially independent systems (as is the case in the system shown in FIGS. 4A and 4B), there is a single first lens which can be placed close to the source plane and this improves the overall optical performance and efficiency of the system (e.g. by reducing the losses and increasing the signal to noise ratio). Furthermore by using only a small number of non-rotationally symmetric lenses (e.g. only one), the overall quality of the lenses in the system is increased and this further improves the optical performance (e.g. reduced losses and/or aberrations). Additionally, the distance between the source plane 204 and the modulator plane 206 is reduced resulting in a more compact, and hence faster, optical projection system (i.e. since the optical path is shorter the time taken for the light to traverse the optical path is reduced). This increase in speed may be particularly beneficial where the optical projection system is used in an optical computing element that is positioned within an iterative loop and so is executed many times when performing a calculation.

Figure 5A:
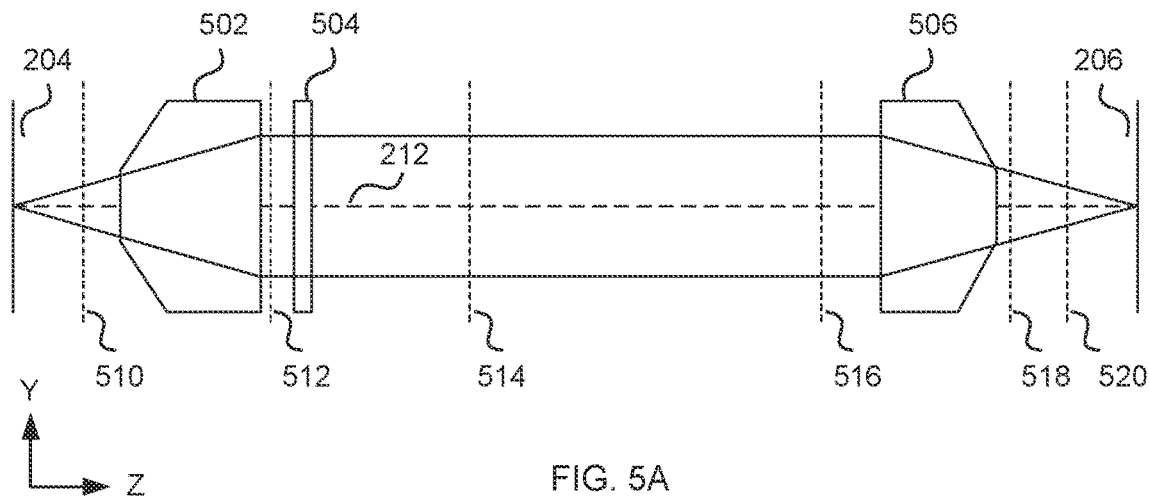
FIGS. 5A and 5B are schematic diagrams of a first example of an improved optical projection system.
Figure 5B:
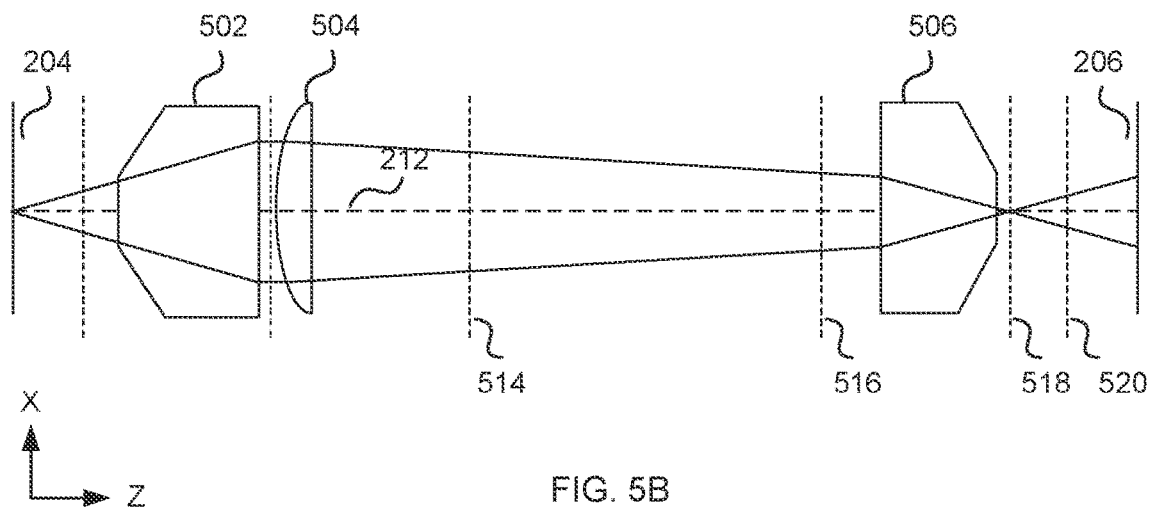

FIGS. 5A and 5B show a first example of an improved optical projection system which uses a combination of lenses which are rotationally symmetric about the optical axis and lenses which are not rotationally symmetric about the optical axis. FIG. 5A shows a side view and FIG. 5B shows a top view and the x, y, z-axes are shown in the same orientation as they are in FIGS. 2, 3, 4A and 4B.

The system shown in FIGS. 5A and 5B comprises three lens arrangements 502, 504, 506. Each of these lens arrangements may be a compound lens or a simple lens. Of these three lens arrangements 502, 504, 506, the first and third lens arrangements 502, 506 are rotationally symmetric about the optical axis 212 and the second lens arrangement 504 is not rotationally symmetric about the optical axis 212. The second lens arrangement 504 has optical power in a first orientation that is perpendicular to the optical axis 212 and no optical power in a second orientation that is perpendicular to both the optical axis 212 and the first orientation. In the arrangement shown in FIGS. 5A and 5B, the first orientation, where the second lens arrangement 504 has optical power, corresponds to the x-axis and the second orientation, where the second lens arrangement 504 has no optical power, corresponds to the y-axis. In the example shown, the second lens arrangement 504 has a positive optical power in the first orientation but in other examples, the second lens arrangement 504 may have a negative optical power in the first orientation. Irrespective of whether the optical power in the first orientation is positive or negative, the optical power in the first orientation is non-zero and there is no optical power in the second orientation.

As a consequence of the rotational symmetry of the first and third lens arrangements 502, 506 and the lack of optical power in the y direction of the second lens arrangement 504, in the y direction (as shown in the side view in FIG. 5A), the sources (on source plane 204) are focused onto the modulator (on modulator plane 206), i.e. the focal length of the third lens arrangement 506 is selected according to the spacing between the third lens arrangement 506 and the modulator plane 206. In the x direction, however, the second lens arrangement 504 does have optical power, this means that it focusses the light emitted from the rear aperture of the first lens arrangement 502. The consequence of the additional optical power in the x direction (as provided by the second lens arrangement 504) is that light emitted from the sources (on source plane 204) is spread laterally onto the modulator (on modulator plane 206). Where the optical power in the x direction is positive, the light emitted from the sources (on source plane 204) is focused in the x direction before it reaches the modulator plane 206 and then diverges so that it is spread laterally onto the modulator (on modulator plane 206). Where the optical power in the x direction is negative, the light emitted from the sources (on source plane 204) diverges more in the x direction than in the y direction between the second and third lens arrangements, with the focal plane in the x direction being beyond the modulator plane 206. This means that the light emitted by the sources is spread laterally onto the modulator (on modulator plane 206). This lateral spreading results in each source (or group of sources) illuminating a different row of modulator elements (e.g. as shown in FIG. 1).

The focal point of the combination of the three lens arrangements 502, 504, 506 in the y direction lies on the modulator plane 206 (as shown in FIG. 5A) whereas the focal point of the combination of the three lens arrangements 502, 504, 506 in the x direction lies on a plane 518 between the third lens arrangement 506 and the modulator plane 206 (as shown in FIG. 5B) because in this example the second lens arrangement 504 has positive optical power in the x direction. This is represented graphically in FIG. 6 which shows a representative image of a source at the source plane 204, the modulator plane 206 and a plurality of intermediate planes 510-520 in the system shown in FIGS. 5A and 5B including the focal plane 518 in the x direction. These intermediate planes are not physical entities within the system but are just used for purposes of explanation to provide a view into the operation of the system at different intermediate positions between the source plane 204 and the modulator plane 206. Whilst FIG. 6 shows a single source, this is for purpose of explanation only and it will be appreciated that any system will comprise an array of sources, as described above with reference to FIGS. 1-3.

Figure 6:
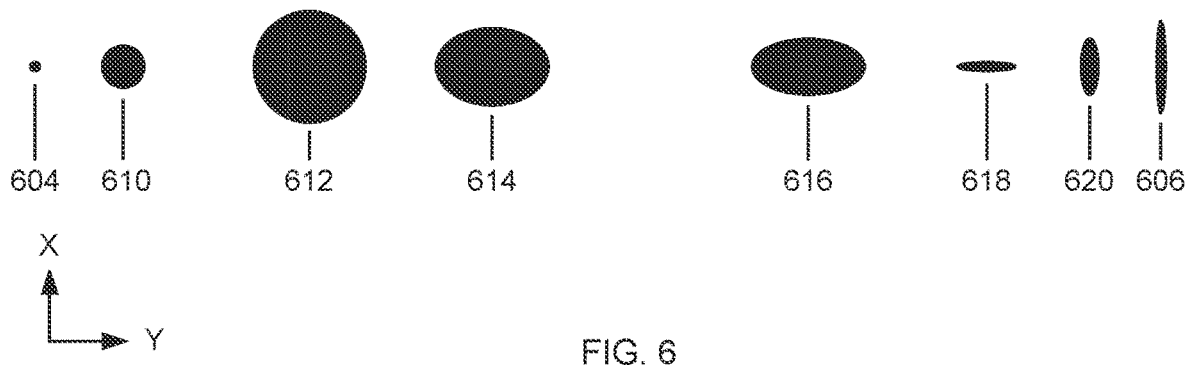
FIG. 6 is a graphical representation of light at various points in the system shown in FIGS. 5A and 5B.

In FIG. 6, the source is represented as a circle 604 at the source plane 204. Assuming the light from the source diverges in a rotationally symmetrical manner, at the first intermediate plane 510 (between the source plane 204 and the first lens arrangement 502), the light from the source is a larger circle 610. Having passed through the rotationally symmetric first lens arrangement 502, the light from the first source is still a circle 612 at the next intermediate plane 512 that is between the first and second lens arrangements 502, 504. The third and fourth intermediate planes 514, 516 are between the second and third lens arrangements 504, 506 and show that the optical power of the second lens arrangement 504 in the x direction causes the light to converge and the source is now represented by ellipses 614, 616. As the second lens arrangement 504 has no optical power in the y direction, the width of the ellipse in the y direction remains unchanged between the second intermediate plane 512 and the fourth intermediate plane 516. The next (fifth) intermediate plane is the focal plane 518 in the x direction and therefore the source is focused in the x direction, as shown by the ellipse 618. The third lens arrangement 506 causes the light to converge in both x and y directions so the width of the ellipse 618 in the y direction is less than it was prior to the third lens arrangement (e.g. at the third and fourth intermediate planes 514, 516). The sixth intermediate plane 520 is between the focal plane 518 in the x direction and the modulator plane 206 and so, since the previous intermediate plane 518, the light has continued to converge in the y direction but has diverged in the x direction, as shown by ellipse 620. By the time the light reaches the modulator plane 206, the light has further converged in the y direction and diverged in the x direction and in the y direction it is now focused, as shown by ellipse 606.

As described above, for the example shown in FIGS. 5A, 5B and 6, the second lens arrangement 504 has positive optical power in the x direction. In other examples, however, the second lens arrangement 504 may have negative optical power in the x direction. In this case, the focal point of the combination of the three lens arrangements 502, 504, 506 in the x direction lies on a plane which is beyond the modulator plane 206 (i.e. to the right of the modulator plane 206 in the orientation shown in FIG. 5B).

The amount of light captured by the projection system shown in FIGS. 5A and 5B is dependent upon the numerical aperture of the first lens arrangement 502 and the distance between the source plane 204 and the first lens arrangement 502. The amount of light captured by the projection system is not dependent upon the distance between the source plane 204 and the second lens arrangement 504 and this provides additional design flexibility and tolerances as well as reducing the overall size of the optical projection system (i.e. reducing the distance between the source plane 204 and the modulator plane 206) and improving the overall optical efficiency and performance (e.g. in terms of signal to noise ratio) compared to interleaved 4F/2F systems such as shown in FIGS. 4A and 4B. The use of a single optical system where the amount of light captured is only dependent upon the first lens arrangement 502 is particularly beneficial when used with optical sources which have a more divergent output beam (e.g. microLEDs which have a more divergent output beam than VCSELs). The reduction in size, as a consequence of the removal of a strict requirement in the positioning of the second lens arrangement 504, increases the speed of operation of an optical computing element that comprises the projection system and this is particularly beneficial where the optical computing element is used in an iterative loop. In addition, the system of FIGS. 5A and 5B includes only one non-rotationally symmetric lens arrangement, the second lens arrangement 504, which enables use of higher quality lenses and further increases the optical efficiency and reduces aberrations compared to systems that use only cylindrical lenses, or which use a larger number of cylindrical lenses.

The amount of spreading of the light in the x direction at the modulator plane 206 is dependent upon the back aperture of the first lens arrangement 502, the optical power in the x direction of the second lens arrangement 504 and the optical power of the third lens arrangement 506. The lens arrangements 502, 504, 506 may be selected so that the light is spread over the entire width of the modulator or, where there is more than one source in each of the N groups of sources, the lens arrangements 502, 504, 506 may be selected so that the light from each of the different sources in a group of sources is spread over a different portion of the width of the modulator. This may be particularly useful in implementations where the modulator comprises a large number of independently controlled elements in the x direction (i.e. for large values of M). This is shown graphically in FIGS. 7A, 7B and 7C. The lens arrangements 502, 504, 506 may also be selected so that the light from different sources (or groups of sources) does not overlap in the y direction on the modulator plane 206 (i.e. such that the resolution of the combination of the first and third lens arrangements 502, 506 in the y direction does not exceed the spacing of independently controlled rows of modulator elements).

Figure 7A:
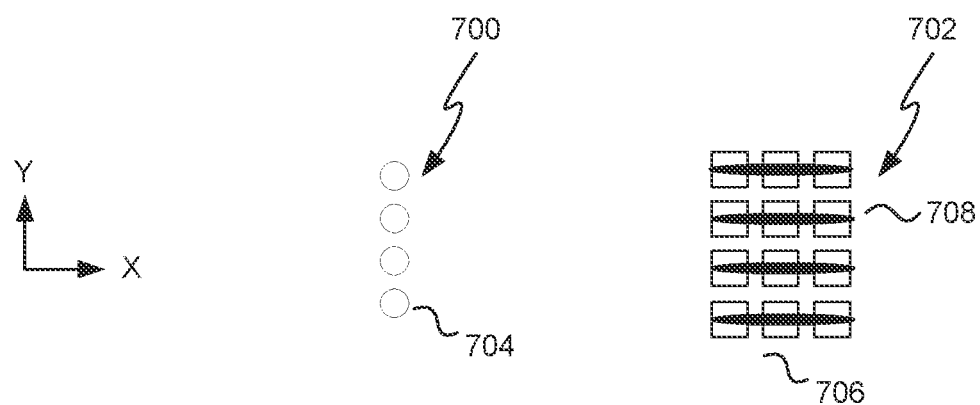
FIGS. 7A, 7B and 7C are graphical representation of light incident on the modulator array for different implementations of the system shown in FIGS. 5A and 5B.

FIG. 7A shows an array of sources 700 and a modulator 702. The array of sources 700 comprises 4 groups of sources (N=4), with each group comprising a single source 704 shown as a circle. The modulator 702 is a 3×4 modulator (M=3, N=4) with each modulator element 706 shown as a square. FIG. 7A also shows the incident light from the four sources 704 which is spread laterally across all the modulator elements in a row, as indicated by the solid ellipses 708.

Figure 7B:
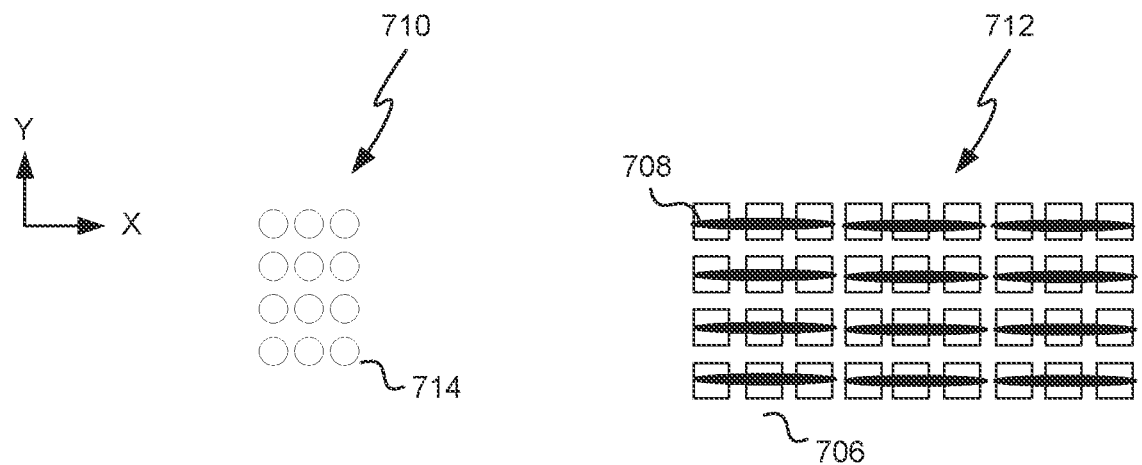

FIG. 7B shows an array of sources 710 and a modulator 712. The array of sources 710 comprises 4 groups of sources (N=4), with each group comprising 3 sources 714 shown as circles. The modulator 712 is a 9×4 modulator (M=9, N=4) with each modulator element 706 shown as a square. FIG. 7B also shows the incident light from each source in the four groups of sources 714 which is, for each source 714, spread laterally across a group of adjacent modulator elements in a row, as indicated by the solid ellipses 708. In this example, the groups of modulator elements that are illuminated by the different sources are non-overlapping.

Figure 7C:
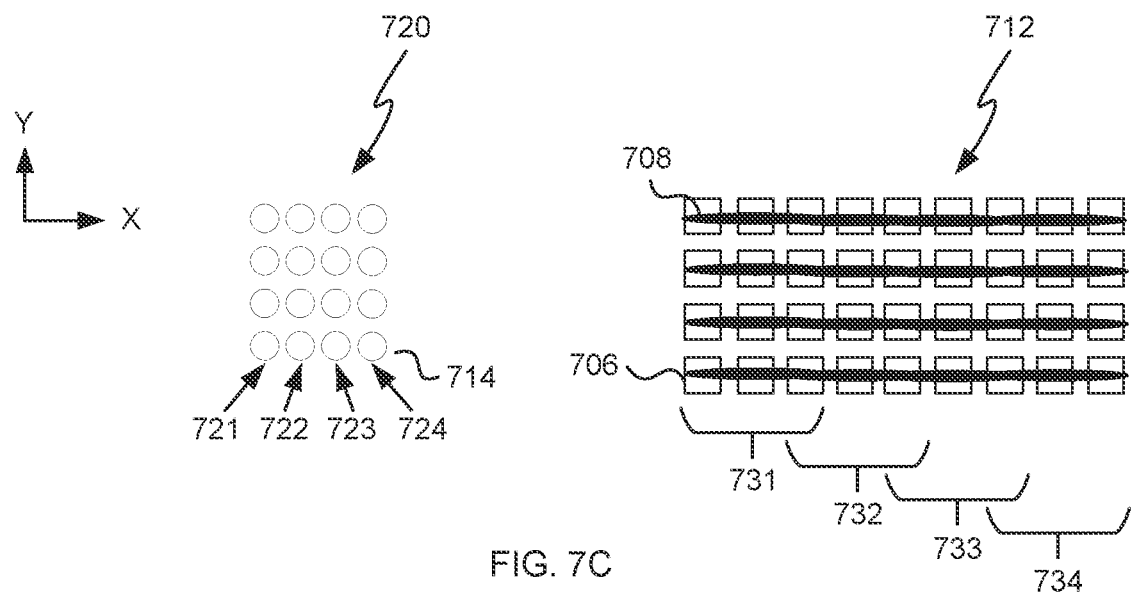

FIG. 7C shows an array of sources 720 and a modulator 712. The array of sources 720 comprises 4 groups of sources (N=4), with each group comprising 4 sources 714 shown as circles. The modulator 712 is a 9×4 modulator (M=9, N=4) with each modulator element 706 shown as a square. FIG. 7C also shows the incident light from each source in the four groups of sources 714 which is, for each source 714, spread laterally across a group of adjacent modulator elements in a row, as indicated by the solid ellipses 708. In this example, the groups of modulator elements that are illuminated by the different sources are overlapping. Each column of sources 721-724 (one per group of sources, as the groups are arranged in rows) illuminates a corresponding overlapping group of adjacent modulator elements 706 in a respective row (where the overlapping groups are indicated by the overlapping brackets 731-734 in FIG. 7C). By overlapping the light, as shown in FIG. 7C, by increasing the number of sources in a group and not changing the spreading of the light in the x direction (e.g. the ellipses 708 in both FIGS. 7B and 7C are the same shape and size), it increases the incident power on some of the modulator elements. By further overlapping the incident groups (e.g. so that each modulator element receives light from more than one source in a group), the incident power on a modulator element can be increased further.

In order to change the alignment for the ellipses 708 from non-overlapping, as in FIG. 7B, to overlapping, as in FIG. 7C, the power and/or position of the second lens arrangement 504 may be changed. Increasing the power of the second lens arrangement 504 in the first (e.g. x) direction increases the spreading (and hence the overlapping) as it causes the light to converge more. Similarly, increasing the spacing of the second and third lens arrangements 504, 506

(along the optical axis 212) increases the spreading as the light has a greater distance in which to converge than where the second lens arrangement 504 is closer to the third lens arrangement 506. It will be appreciated that the spacing between the third lens arrangement 506 and the modulator plane 206 is fixed by the focal length of the third lens arrangement 506 in the second (e.g. y) direction.

In a variation of that shown in FIG. 7C, the optical power in the x direction of the second lens arrangement 504 may be increased such that the light from each source is spread laterally over all of the modulator elements and in such an example, all the ellipses (from the different sources) in a row substantially overlap. As described above, this increase the incident power on a modulator element.

As described above, each of the lens arrangements 502, 504, 506 shown in FIGS. 5A and 5B may be a compound lens or a simple lens. For example, the first and third lens arrangements 502, 506 may be compound lenses and the second lens arrangement 504 may be a simple lens (e.g. a simple cylindrical lens). The first lens arrangement 502 may, for example, be an objective lens and the third lens arrangement 506 may, for example, be a tube lens. The use of compound lenses for the first and/or third lens arrangements, rather than a simple lens, enables a reduction in defects or aberrations that may be caused by using a single lens (e.g. by enabling a larger overall optical power whilst reducing the optical power of any one individual lens, thereby reducing aberrations).

Any one or more of the lens arrangements 502, 504, 506 may comprise a microlens array. Where the first and/or third lens arrangement 502, 506 comprises a microlens array, each of the individual microlenses in the microlens array is rotationally symmetric about its optical axis (i.e. about the optical axis of the particular microlens, with the optical axis of the microlenses being parallel to the global optical axis 212). Where the second lens arrangement 504 comprises a microlens array, each of the individual microlenses in the microlens array is not rotationally symmetric about its optical axis. Instead, each individual microlens has optical power in a first orientation that is perpendicular to the optical axis and no optical power in a second orientation that is perpendicular to both the optical axis and the first orientation. The first orientations for each of the microlenses are parallel to each other and the second orientations for each of the microlenses are parallel to each other, e.g. for each microlens the first orientation may be the x direction and the second orientation may be the y direction.

Figure 8A:
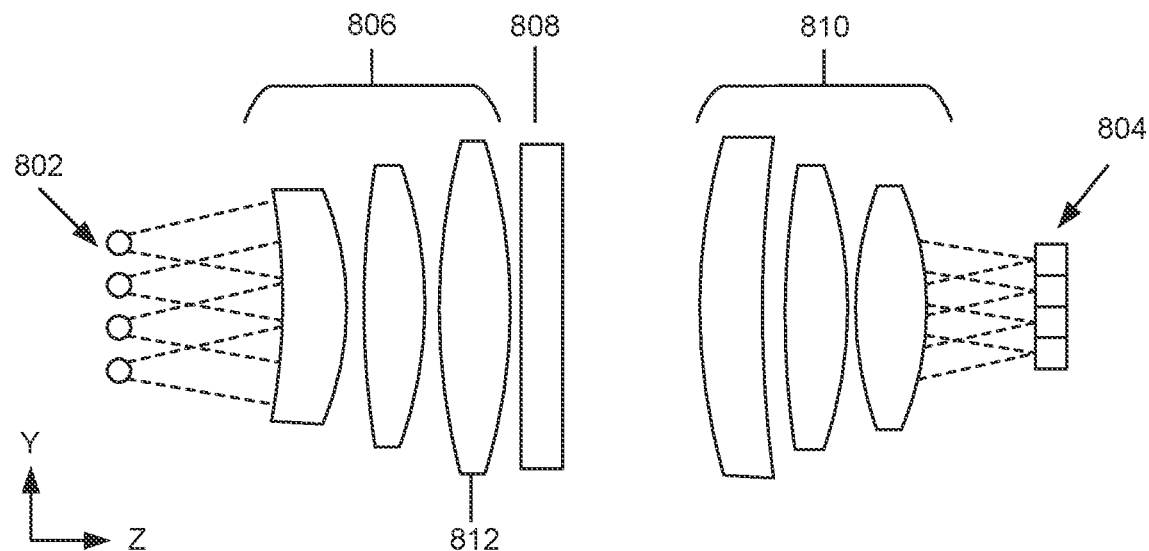
FIGS. 8A and 8B are schematic diagrams of a second example of an improved optical projection system.
Figure 8B:
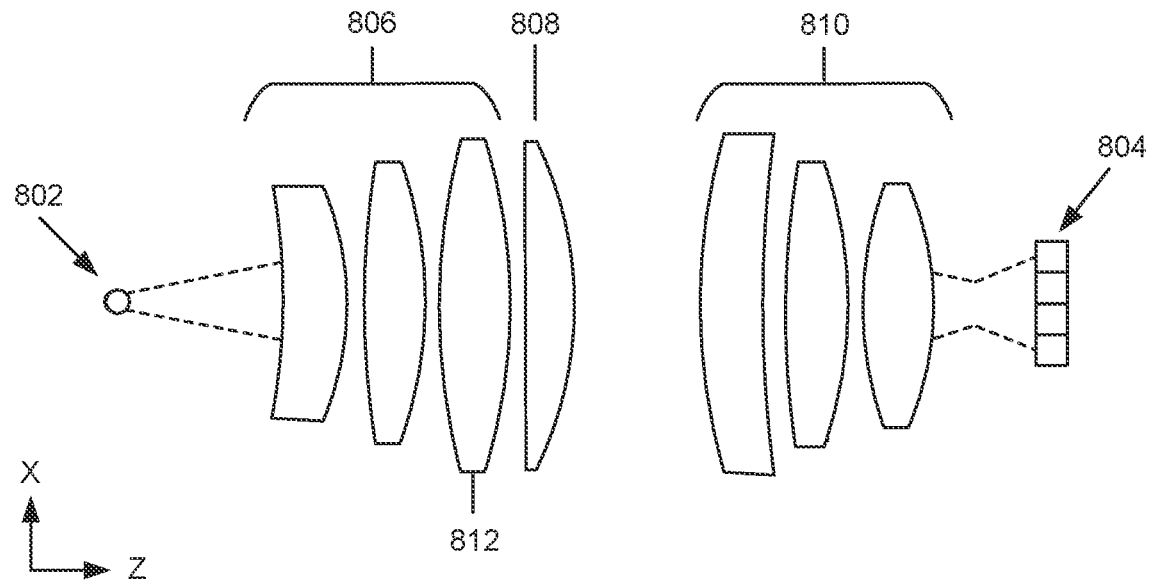

FIGS. 8A and 8B show a second example of an improved optical projection system which uses a combination of lenses which are rotationally symmetric about the optical axis and lenses which are not rotationally symmetric about the optical axis. FIG. 8A shows a side view and FIG. 8B shows a top view and the x, y, z-axes are shown in the same orientation as they are in FIGS. 2, 3, 4A, 4B, 5A, 5B, 6, 7A, 7B and 7C.

FIGS. 8A and 8B show an array of sources 802 and a modulator 804 and a projection system comprising three lens arrangements 806, 808, 810. Of these, the first and third lens arrangements 806, 810 are compound lenses and each comprise three simple lenses, all of which are rotationally symmetric about the optical axis. The second lens arrangement 808 comprises a single, simple, lens that has optical power in a first orientation that is perpendicular to the optical axis 212 and no optical power in a second orientation that is perpendicular to both the optical axis 212 and the first orientation (e.g. it is a cylindrical lens). The projection system operates in the same way as described above with reference to FIGS. 5A, 5B, 6, 7A and 7B.

In the examples described above, the first, second and third lens arrangements are all aligned to each other and to the optical axis 212 of the projection system. In other examples, the first, second and third lens arrangements may be positioned close to the optical axis 212 (e.g. one or more of the first, second and third lens arrangements may be offset by a small distance from the optical axis 212).

Whilst in the examples described above, the first and second lens arrangements are shown as separate elements, in a variation on the systems described above, where the second lens arrangement 504, 808 is a simple lens, it may be integrally formed with a last lens in the first lens arrangement 502, 806. Referring to the example shown in FIGS. 8A and 8B, this would result in the second lens arrangement 808 being integrally formed with the last lens 812 in the first lens arrangement 806. By combining the lenses in this way, the overall part count of the optical projection system is reduced and this makes the manufacturing process faster and simplifies a mechanical arrangement (not shown in the drawings) that holds each of the lenses in position (e.g. aligned to each other along the optical axis). In another example, the first, second and third lens arrangements may be combined, with the first and third lens arrangements being combined into a compound objective+tube lens and the second lens arrangement being integrally formed with a last lens in the first lens arrangement.

Whilst in the examples described above, the second lens arrangement 504, 808 has optical power in a first orientation that is perpendicular to the optical axis 212 and no optical power in a second orientation that is perpendicular to both the optical axis 212 and the first orientation, in other examples, the second lens arrangement 504, 808 may have some optical power in the second orientation that is different from the optical power in the first orientation. More generally, the second lens arrangement 504, 808 has optical power of a first magnitude in a first orientation that is perpendicular to the optical axis 212 and optical power of a second magnitude in a second orientation that is perpendicular to both the optical axis 212 and the first orientation, where the first magnitude is larger than the second magnitude. As described above, in some examples, the second magnitude may be zero. As described above, the optical power in the first and second orientations may be positive or negative. This means that where the optical power in the first orientation is negative (e.g. the optical power in the first orientation is $-X_1$ and the optical power in the second orientation is $-X_2$), the magnitude of the optical power is larger (i.e. $X_1 > X_2$), whereas the absolute optical power is smaller, i.e. more negative, than in the second orientation (i.e. $-X_1 < -X_2$).

Figure 9A:
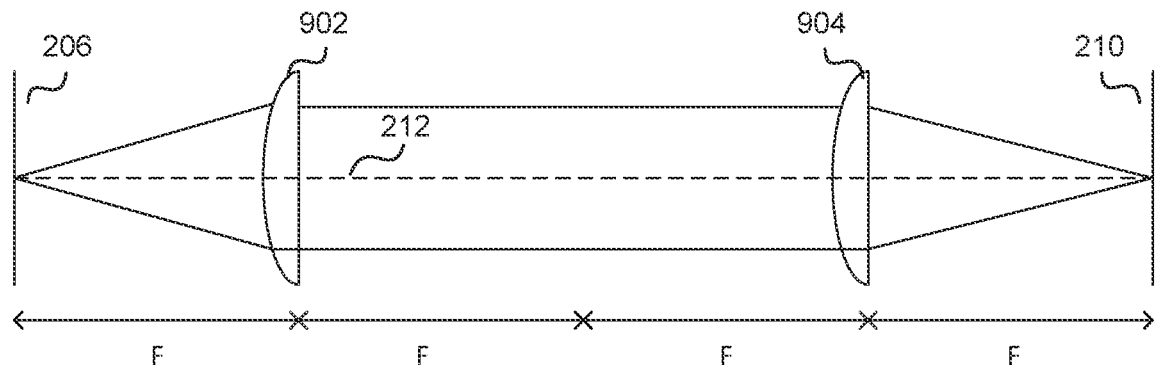
FIGS. 9A and 9B are schematic diagrams of an optical collection system.
Figure 9A:
Figure 9B:
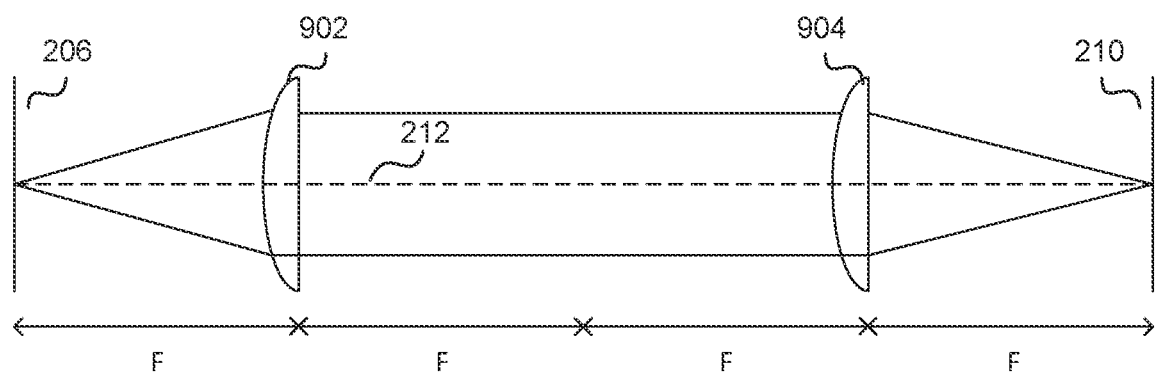
Figure 9B:
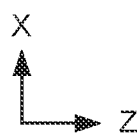

As described above with reference to FIGS. 1-3, an optical computing element that is configured to perform vector-matrix multiplication comprises both an optical projection system 108 and an optical collection system 110. The optical collection system is positioned between the modulator and detector planes 206, 210 and as shown in FIG. 2, the detectors 208 may be rectangular in shape in order to capture light from a column of modulator elements, each rectangular detector 208 corresponding to one of the M regions 114 shown in FIG. 1. In such an example, the optical collection system may comprise a 4F imaging system comprising two rotationally symmetric lens arrangements 902, 904 as shown in FIGS. 9A and 9B. FIG. 9A shows a side view and FIG. 9B shows a top view and the x, y, z-axes are shown in the same orientation as they are in earlier drawings. As the lenses are rotationally symmetric about the optical axis 212, FIGS. 9A and 9B are the same.

Whilst the system shown in FIGS. 9A and 9B works for modulators with small values of N (e.g. N=4 as shown in FIG. 1), as the value of N increases, the size and aspect ratio of the detector increases. The increase in aspect ratio of the detector results in the detector having a higher resistance. The higher resistance reduces the speed of the detector. Consequently, the detector which may not be able to operate at the required speeds (i.e. it may not be able to operate at the required frequency/bandwidth).

Described herein are improved optical collection systems which may be used in an optical computing element to perform vector-matrix multiplication. These improved optical projection systems may, for example, be used in the systems 100, 200, 300 shown in FIGS. 1-3. These systems reduce the spread of light incident on the output plane 210 from a column of modulator elements which enables the use of a smaller and lower aspect ratio, and hence faster, detector. Additionally, by using only a small number of non-rotationally symmetric lenses (e.g. only one), the overall quality of the lenses in the system is increased and this improves the optical performance (e.g. reduced losses and/or aberrations) for the same reasons as described above with reference to the optical projection systems.

Figure 10A:
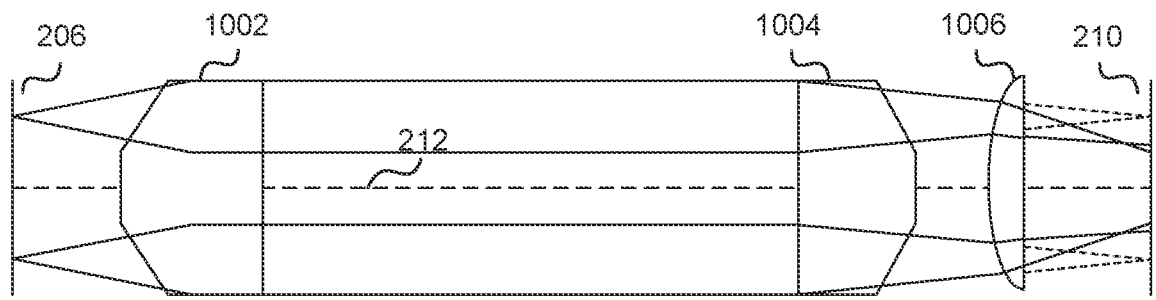
FIGS. 10A and 10B are schematic diagrams of an example of an improved optical collection system.
Figure 10B:
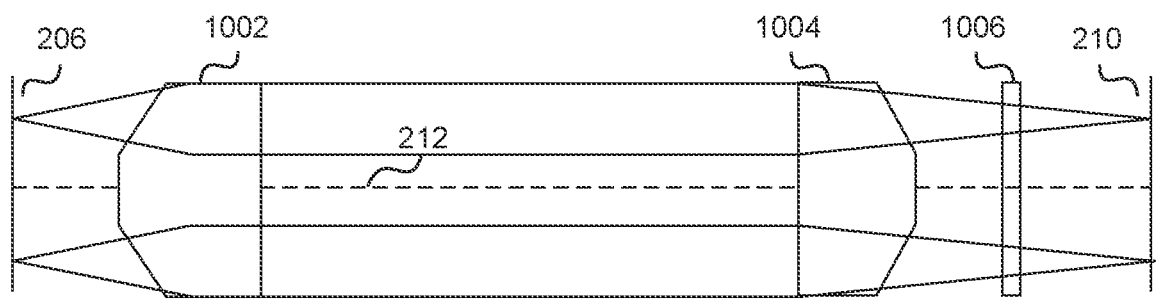

FIGS. 10A and 10B show an example of an improved optical collection system which uses a combination of lenses which are rotationally symmetric about the optical axis and lenses which are not rotationally symmetric about the optical axis. FIG. 10A shows a side view and FIG. 10B shows a top view and the x, y, z-axes are shown in the same orientation as they are in the earlier drawings. Both FIG. 10A and FIG. 10B show the path of the light from two off-axis modulator elements on the modulator plane 206, through the lens arrangements, to the detector plane 210. The two modulator elements shown in FIG. 10A are spaced from the optical axis 212 along the y-axis whereas the two modulator elements shown in FIG. 10B are spaced from the optical axis 212 along the x-axis.

The system shown in FIGS. 10A and 10B comprises three lens arrangements 1002, 1004, 1006. Each of these lens arrangements may be a compound lens or a simple lens. Of these three lens arrangements 1002, 1004, 1006, the first and second lens arrangements 1002, 1004 are rotationally symmetric about the optical axis 212 and the third lens arrangement 1006 is not rotationally symmetric about the optical axis 212. The third lens arrangement 1004 has no optical power in a first orientation that is perpendicular to the optical axis 212 and has optical power in a second orientation that is perpendicular to both the optical axis 212 and the first orientation. In the arrangement shown in FIGS. 10A and 10B, the first orientation, where the third lens arrangement 1006 has no optical power, corresponds to the x-axis and the second orientation, where the third lens arrangement 1006 has optical power, corresponds to the y-axis.

As a consequence of the rotational symmetry of the first and second lens arrangements 1002, 1004 and the lack of optical power in the x direction of the third lens arrangement 1006, in the x direction (as shown in the top view in FIG. 10B), the light from the modulator elements (on modulator plane 206) are focused onto the detectors (on detector plane 210). In the y direction, however, the third lens arrangement 1006 does have optical power, this means that it bends the light emitted from the rear aperture of the second lens arrangement 1004 towards the optical axis (as shown in the side view in FIG. 10A). The consequence of the additional optical power in the y direction (as provided by the third lens arrangement 1006) is that light emitted from the off-axis modulator elements is incident on the detector plane 210 closer to the optical axis but is out of focus (and hence is spread) in the y direction. As the detectors are elongated in the y direction and narrow in the x direction, this spreading does not affect the operation of the detectors.

Figure 11:
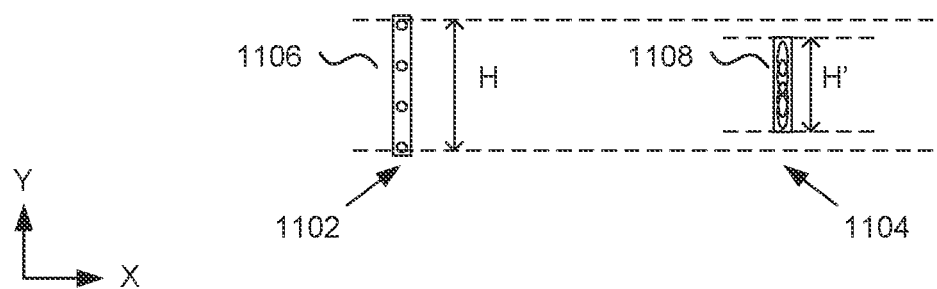
FIG. 11 are graphical representation of light incident on the detectors when using the system shown in FIGS. 9A and 9B and the system shown in FIGS. 10A and 10B.

FIG. 11 shows the effect of the addition of the third lens arrangement 1006 on the required size of the detector. The two diagrams 1102, 1104 show light from a column of four modulator elements incident upon the detector plane 210. The first diagram 1102 represents the situation where there is no third lens arrangement and this requires a detector 1106 with a minimum height of h. The second diagram 1104 represents the situation where there is a third lens arrangement (as shown in FIGS. 10A and 10B) and this requires a detector 1108 with a smaller minimum height of h', where h>h'. As shown in FIG. 11, instead of the modulator elements being imaged in focus (as in the first diagram where the light is shown as circles), the light is spread in the y direction (as shown by the overlapping ellipses with major axes parallel to the y-axis).

As described above, by enabling the size and aspect ratio of the detector to be reduced, its resistance is reduced and its speed of operation (i.e. in terms of frequency/bandwidth) is increased.

Although the examples shown in FIGS. 10A and 10B show the third lens arrangement 1006 positioned after the second lens arrangement 1004 and before the detector plane 210, in other examples, the third lens arrangement 1006 may be positioned between the first and second lens arrangements 1002, 1004, however this may result in a more complex optical design. This is because the second lens arrangement 1004 needs to be positioned where the beams travelling from different positions on the modulator plane are travelling through spatially separate parts of the lens. The spatial separation is greatest closest to the detector plane 210. If the second lens arrangement 1004 is positioned further from the detector plane 210 (e.g. before the third lens arrangement 1006), then the optical power that is required in the y direction is larger in order to have the same effect as a lens arrangement that is closer to the detector plane, and this may introduce unwanted aberrations.

As described above, each of the lens arrangements 1002, 1004, 1006 shown in FIGS. 10A and 10B may be a compound lens or a simple lens. For example, the first and second lens arrangements 1002, 1004 may be compound lenses and the third lens arrangement 1006 may be a simple lens (e.g. a simple cylindrical lens).

In the examples described above, the first, second and third lens arrangements are all aligned to each other and to the optical axis 212 of the projection system. In other examples, the first, second and third lens arrangements may be positioned close to the optical axis 212 (e.g. one or more of the first, second and third lens arrangements may be offset by a small distance from the optical axis 212).

Any one or more of the lens arrangements 1002, 1004, 1006 may comprise a microlens array. Where the first and/or second lens arrangement 1002, 1004 comprises a microlens array, each of the individual microlenses in the microlens array is rotationally symmetric about its own optical axis (which as described above is parallel to the global optical axis 212). Where the third lens arrangement 1006 comprises a microlens array, each of the individual microlenses in the microlens array is not rotationally symmetric about its optical axis. Instead, each individual microlens has no optical power in a first orientation that is perpendicular to the optical axis and has optical power in a second orientation that is perpendicular to both the optical axis and the first orientation. The first orientations for each of the microlenses are parallel to each other and the second orientations for each of the microlenses are parallel to each other, e.g. for each microlens the first orientation may be the x direction and the second orientation may be the y direction.

Whilst in the examples described above, the third lens arrangement 1006 has no optical power in a first orientation that is perpendicular to the optical axis 212 and has optical power in a second orientation that is perpendicular to both the optical axis 212 and the first orientation, in other examples, the third lens arrangement 1006 may have some optical power in the first orientation that is different from the optical power in the second orientation. More generally, the third lens arrangement 1006 has optical power of a third magnitude in a first orientation that is perpendicular to the optical axis 212 and optical power of a fourth magnitude in a second orientation that is perpendicular to both the optical axis 212 and the first orientation, where the fourth magnitude is larger than the third magnitude. As described above, in some examples, the third magnitude may be zero.

Whilst in the examples described above, the second and third lens arrangements in the optical collection system are shown as separate elements, in a variation on the systems described above, where the third lens arrangement 1006 is a simple lens, it may be integrally formed with a last lens in the second lens arrangement 1004. By combining the lenses in this way, the overall part count of the optical collection system is reduced and this makes the manufacturing process faster and simplifies a mechanical arrangement (not shown in the drawings) that holds each of the lenses in position (e.g. aligned to each other along the optical axis).

Figure 12A:
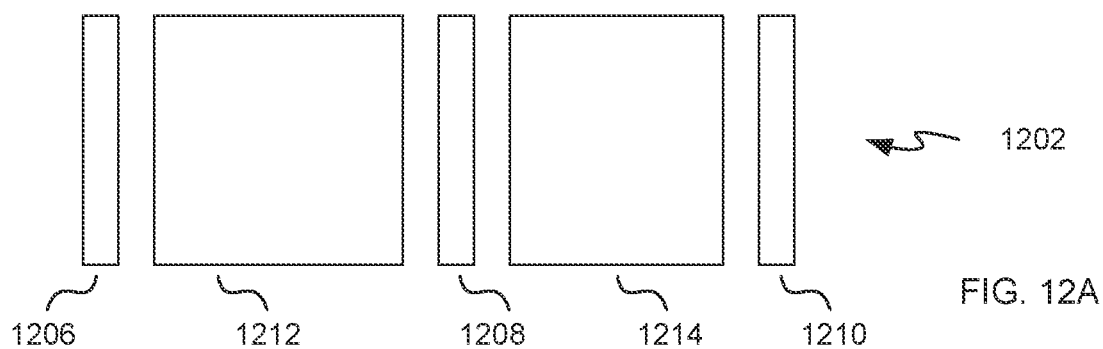
FIGS. 12A, 12B and 12C show schematic diagrams of three example optical computing elements for performing vector-matrix multiplication that use the improved optical projection systems described herein.
Figure 12B:
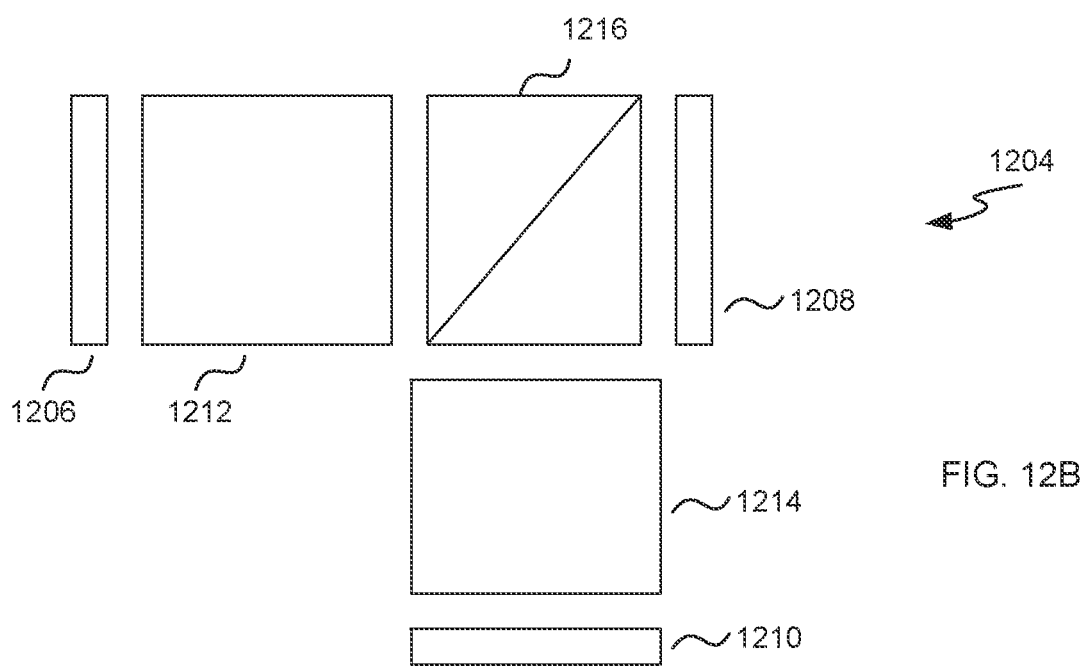
Figure 12C:
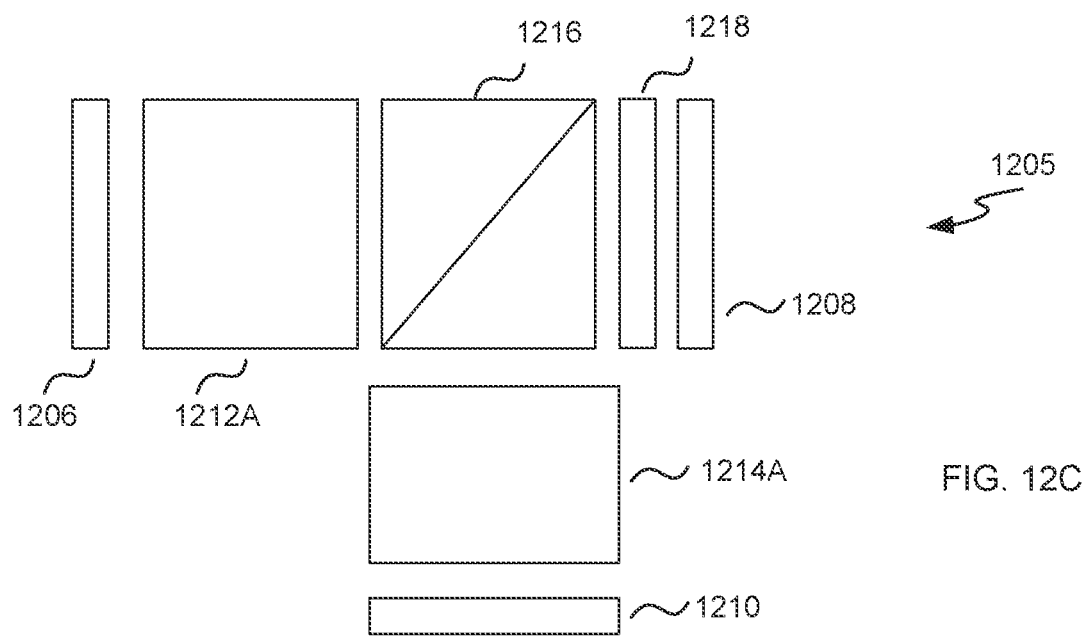

FIGS. 12A, 12B and 12C show schematic diagrams of three example optical computing elements 1202, 1204, 1205 for performing vector-matrix multiplication that use the improved optical projection systems described above. As described above, these optical computing elements 1202, 1204, 1205 may be used for computations such as optimization problems (e.g. which use gradient descent) and in some implementations may be placed within an iterative loop. By using optical computing elements, rather than conventional digital hardware (e.g. CPUs, GPUs, or dedicated electronic hardware blocks), the resulting hardware has a reduced component count which simplifies manufacturing, is faster and is more efficient, particularly at scale (e.g. large values of N and/or M).

All three example optical computing elements 1202, 1204, 1205 comprise an array of N groups of sources 1206, where, as described above, each group of sources may comprise one source or each group of sources may comprise a plurality of sources. All three example optical computing elements 1202, 1204 also comprise a N×M modulator 1208 which may operate in transmission (as in FIG. 12A) or in reflection (as in FIGS. 12B and 12C). Each of the modulator elements in the N×M modulator 1208 may use polarization to modulate the incident light (e.g. where the incident light is linearly polarized and by changing the voltage applied to a modulator element, the amount of transmitted/reflected light from the modulator element can be controlled). All three example optical computing elements 1202, 1204, 1205 further comprise an array of M detectors 1210, or M groups of detectors (where each group of detectors may comprise one detector or each group of detectors may comprise a plurality of detectors, in an analogous manner to the sources).

The example optical computing elements 1202, 1204 shown in FIGS. 12A and 12B additionally comprise an optical projection system 1212 between the sources 1206 and the modulator 1208 and an optical collection system 1214 between the modulator 1208 and the detectors 1210. The second optical computing element 1204 that operates in reflection (as shown in FIG. 12B) also comprises a beam-splitter 1216. The optical projection system 1212 may correspond to the system shown in FIGS. 5A and 5B and described above or the system shown in FIGS. 8A and 8B and described above, or any variation thereof. The optical collection system 1214 may correspond to the system shown in FIGS. 10A and 10B and described above, or any variation thereof. It will be appreciated that the improved optical projection systems described above (and shown in FIGS. 5A and 5B or 8A and 8B) may alternatively be used with any suitable optical collection system and similarly, the improved optical collection system described above (and shown in FIGS. 10A and 10B) may alternatively be used with any suitable optical projection system.

Whilst in FIG. 12B the beam-splitter 1216 is shown between the optical projection system 1212 and the modulator 1208, in other examples the optical projection system may be split such that a first part of it 1212A is before the beam-splitter and a second part of it 1218 is between the beam-splitter 1216 and the modulator 1208. In this arrangement, the second part of the optical projection system 1218 also forms part of the optical collection system, along with a second part of the optical collection system 1214A that is positioned between the beam-splitter 1216 and the detectors 1210.

Alternatively or in addition to the other examples described herein, examples include any combination of the following further examples. Features of any one of the further examples below may be combined with features of others of the further examples below.

A first further example provides an optical projection system for an optical computing element, the optical projection system having an optical axis and comprising first, second and third lens arrangements, wherein the first and third lens arrangements are rotationally symmetric about the optical axis and are positioned to capture light from an array of sources on a source plane and image the sources onto an output plane, and wherein the second lens arrangement is positioned between the first and third lens arrangements and has optical power of a first magnitude in a first orientation and an optical power of a second magnitude in a second orientation, wherein the first magnitude is larger than the second magnitude and wherein the first orientation is orthogonal to the second orientation and both the first and second orientations are orthogonal to the optical axis.

In the first further example, the second magnitude may be zero.

In the first further example, the optical power of the second lens arrangement in the first orientation may be positive. Alternatively, the optical power of the second lens arrangement in the first orientation may be negative.

In the first further example, the first lens arrangement may be a compound lens. The second lens arrangement may be a cylindrical lens and where the second lens is a cylindrical lens, the cylindrical lens may be integrally formed with a last lens in the first lens arrangement.

In the first further example, the third lens arrangement may be a compound lens.

In the first further example, the second lens arrangement may be a cylindrical lens.

In the first further example, at least one of the first lens arrangement, the second lens arrangement and the third lens arrangement may be a microlens array.

In the first further example, the first, second and third lens arrangements may be aligned on the optical axis or may be positioned close to the optical axis.

The first further example may comprise any combination of the features described above.

A second further example provides an optical computing element comprising: an optical projection system according to any combination of features of the first further example described above; the array of sources; a modulator; an optical collection system; and an array of detectors, wherein the optical projection system is positioned between the array of sources and the modulator and the optical collection system is positioned between the modulator and the array of detectors.

In the second further example, the modulator may operate in reflection and the optical computing element may further comprise a beam-splitter positioned between the optical projection system and the modulator. Alternatively, the modulator may operate in transmission.

In the second further example, the modulator may comprise a two-dimensional array of modulator elements and the optical power of the second lens arrangement in the first direction causes light from a source to be spread over all of the modulator elements in a row of the two-dimensional array, wherein a row of the two-dimensional array is parallel to the first direction.

In the second further example, the modulator may comprise a two-dimensional array of modulator elements, the array of sources may comprise a plurality of groups of sources and the optical power of the second lens arrangement in the first direction causes light from each source in a group of sources to be spread over a different subset of modulator elements in a row of the two-dimensional array, wherein a row of the two-dimensional array is parallel to the first direction.

In the second further example, the array of sources may comprise an array of microLEDs.

In the second further example, the optical collection system may comprise fourth, fifth and sixth lens arrangements, wherein the fourth and fifth lens arrangements are rotationally symmetric about the optical axis and are positioned to capture light from the modulator and image the light onto the array of detectors, and wherein the sixth lens arrangement is positioned between the fifth lens arrangement and the array of detectors and has optical power of a third magnitude in the first orientation and optical power of a fourth magnitude in the second orientation, wherein the fourth magnitude is larger than the third magnitude. The third magnitude may be zero.

In the second further example, the fourth, fifth and sixth lens arrangements may be aligned on the optical axis or may be positioned close to the optical axis.

In the second further example, the fifth lens arrangement may be a compound lens and the sixth lens arrangement may be a cylindrical lens and the cylindrical lens may be integrally formed with a last lens in the fifth lens arrangement.

In the second further example, the sixth lens arrangement may be a cylindrical lens.

The second further example may comprise any combination of the features described above.

A third further example provides an optical collection system for an optical computing element, the optical collection system having an optical axis and comprising fourth, fifth and sixth lens arrangements, wherein the fourth and fifth lens arrangements are rotationally symmetric about the optical axis and are positioned to capture light from an input plane and image it onto an output plane, and wherein the sixth lens arrangement is positioned between the fifth lens arrangement and the output plane and has optical power of a third magnitude in a first orientation and optical power of a fourth magnitude in a second orientation, wherein the fourth magnitude is larger than the third magnitude, the first orientation is orthogonal to the second orientation and both the first and second orientations are orthogonal to the optical axis. The third magnitude may be zero In the third further example, at least one of the fourth lens arrangement and the fifth lens arrangement may be a compound lens.

In the third further example, the fifth lens arrangement may be a compound lens and the sixth lens arrangement may be a cylindrical lens and the cylindrical lens may be integrally formed with a last lens in the fifth lens arrangement.

In the third further example, the sixth lens arrangement may be a cylindrical lens.

In the third further example, at least one of the fourth lens arrangement, the fifth lens arrangement and the sixth lens arrangement may be a microlens array.

In the third further example, the fourth, fifth and sixth lens arrangements may be aligned on the optical axis or may be positioned close to the optical axis.

The third further example may comprise any combination of the features described above.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An optical computing element comprising:
   first, second, and third lens arrangements along an optical axis;
   a two-dimensional modulator array comprising multiple sets of modulator elements, the modulator elements within each set being arrayed along a first direction, and the multiple sets being arrayed along a second direction, the first and second directions being mutually orthogonal directions in a modulator plane perpendicular to the optical axis; and
   a source array comprising light sources arrayed, in a source plane orthogonal to the optical axis, along the second direction,
   wherein the first and third lens arrangements are rotationally symmetric about the optical axis,
   wherein the second lens arrangement is positioned between the first and third lens arrangements and has an optical power of a first magnitude in the first direction and an optical power of a second magnitude in the second direction,
   wherein the first, second, and third lens arrangements are configured to create an image of the light sources on the modulator array that is focused in the second direction and out of focus in the first direction such that light from different ones of the light sources is spread along the first direction over different corresponding sets of modulator elements.

2. The optical computing element according to claim 1, wherein the first lens arrangement is a compound lens.

3. The optical computing element according to claim 2, wherein the second lens arrangement is a cylindrical lens and the cylindrical lens is integrally formed with a last lens in the first lens arrangement.

4. The optical computing element according to claim 1, wherein the third lens arrangement is a compound lens.

5. The optical computing element according to claim 1, wherein the second lens arrangement is a cylindrical lens.

6. The optical computing element according to claim 1, wherein at least one of the first lens arrangement, the second lens arrangement and the third lens arrangement is a microlens array.

7. The optical computing element according to claim 1, further comprising:
   an optical collection system; and
   a detector array comprising detectors arrayed, in a detector plane orthogonal to the optical axis, along the first direction,
   wherein the optical collection system is positioned between the modulator array and the detector array of, the optical collection system and the detector array being configured such that the detectors collect light from the modulator elements within the multiple sets across the second direction while separating the light across the first direction between the modulator elements within each set.

8. The optical computing element according to claim 7, wherein the modulator array operates in reflection, the optical computing element further comprising a beam-splitter positioned between the first, second, and third lens arrangements and the modulator array.

9. The optical computing element according to claim 7, wherein the source array comprises an array of microLEDs.

10. The optical computing element according to claim 7, wherein the optical collection system comprises fourth, fifth, and sixth lens arrangements,
    wherein the fourth and fifth lens arrangements are rotationally symmetric about the optical axis, and
    wherein the sixth lens arrangement is positioned between the fifth lens arrangement and the detector array and has optical power of a third magnitude in the first direction and optical power of a fourth magnitude in the second direction.

11. The optical computing element according to claim 10, wherein the fifth lens arrangement is a compound lens and the sixth lens arrangement is a cylindrical lens and the cylindrical lens is integrally formed with a last lens in the fifth lens arrangement.

12. The optical computing element according to claim 10, wherein the sixth lens arrangement is a cylindrical lens.

13. The optical computing element according to claim 7, the optical collection system comprising fourth, fifth, and sixth lens arrangements,
    wherein the fourth and fifth lens arrangements are rotationally symmetric about the optical axis and are positioned to capture light from an input plane and image it onto an output plane, and
    wherein the sixth lens arrangement is positioned between the fifth lens arrangement and the output plane and has optical power of a third magnitude in the first direction and optical power of a fourth magnitude in the second direction, wherein the fourth magnitude is larger than the third magnitude.

14. The optical computing element according to claim 13, wherein at least one of the fourth lens arrangement and the fifth lens arrangement is a compound lens.

15. The optical computing element according to claim 13, wherein the fifth lens arrangement is a compound lens and the sixth lens arrangement is a cylindrical lens and the cylindrical lens is integrally formed with a last lens in the fifth lens arrangement.

16. The optical computing element according to claim 13, wherein the sixth lens arrangement is a cylindrical lens.

17. The optical computing element according to claim 13, wherein at least one of the fourth lens arrangement, the fifth lens arrangement, and the sixth lens arrangement is a microlens array.

18. The optical computing element according to claim 1, wherein the first, second, and third lens arrangements are configured to cause light from each light source to be spread over all of the modulator elements in the corresponding set of modulator elements.

19. The optical computing element according to claim 1, wherein the source array comprises a plurality of groups of light sources, the groups arrayed along the second direction, and wherein the first, second, and third lens arrangements are configured to cause light from each light source within a group of light sources to be spread over a different subset of modulator elements in a corresponding set of modulator elements of the two-dimensional modulator array.

* * * * *